United States Patent [19]
Dortenzo

[11] 3,724,827
[45] Apr. 3, 1973

[54] ANTI-POLLUTION DEVICE FOR A METALLURGICAL VESSEL

[75] Inventor: Alexander T. Dortenzo, Pittsburgh, Pa.

[73] Assignee: Pennsylvania Engineering Corporation, Pittsburgh, Pa.

[22] Filed: Oct. 20, 1971

[21] Appl. No.: 190,790

[52] U.S. Cl. ................................266/15, 266/36 P
[51] Int. Cl. ................................................C21c 5/38
[58] Field of Search..........266/39, 15, 16, 19, 20, 24, 266/36 P

[56] References Cited

UNITED STATES PATENTS

| | | | |
|---|---|---|---|
| 2,803,450 | 8/1957 | McFeaters | 266/35 |
| 3,014,255 | 12/1961 | Bussard et al. | 266/34 V |

*Primary Examiner*—Gerald A. Dost
*Attorney*—Ralph G. Hohenfeldt et al.

[57] ABSTRACT

A vessel for converting molten ferrous metal to steel is mounted for pivoting about a horizontal axis and has bottom tuyeres which permit blowing of oxygen, other gases and powdered materials upwardly through molten metal inside of the vessel. A smoke hood is engaged with the open mouth of the vessel when it is untilted and is disengaged when the vessel is tilted for discharging or charging it. An enclosure at least partially surrounds the vessel. Devices for producing air curtains are situated adjacent certain openings in the enclosure to prevent influx of air into the enclosure and thereby maintain subatmospheric pressure within it so that smoke is drawn from the enclosure by an exhaust system connected to the hood instead of being released to the atmosphere.

9 Claims, 3 Drawing Figures

INVENTOR
ALEXANDER T. DORTENZO

BY

ATTORNEYS

ANTI-POLLUTION DEVICE FOR A METALLURGICAL VESSEL

BACKGROUND OF THE INVENTION

This invention relates to means for preventing the escape of smoke and noxious gases from a metallurgical vessel when it is uncoupled from its exhaust system. Typical vessels to which the invention is applicable are argon-oxygen converters and top and bottom-blown basic oxygen converters. A bottom-blown basic oxygen converter is used to illustrate an application of the invention. A converter of this type is usually surrounded by an enclosure having a smoke hood near its top connected to an exhaust system. When it is desired to tilt the vessel on its horizontal axis for discharging the molten contents or for introducing scrap and other materials through its top mouth, the smoke hood is lifted or otherwise uncoupled from the vessel and smoke and other gases are able to escape from the enclosure and thereby pollute the atmosphere.

When the vessel is uncoupled from its smoke hood, the exhaust system draws in atmospheric air through various openings in the enclosure which must necessarily be present for admitting slag ladles, teeming ladles and the like. There is usually an opening for admitting the spout of a scrap car from which the vessel may be charged with scrap when it is tilted toward that opening. The scrap charging operation is usually accompanied by evolution of large quantities of smoke from the vessel.

In top-blown basic oxygen converters, oxygen is introduced into the vessel by means of a lance extending downwardly through the upper end of the vessel. In argon-oxygen and bottom-blown converter vessels, the oxygen or other gas is introduced through tuyeres located below the level of the molten metal in the vessel. When top-blown basic oxygen converters are tilted for receiving hot metal and scrap, for example, the oxygen lance is normally turned off. This is also possible in connection with argon-oxygen converters where the tuyeres are located in the sides of the vessel so that they would be free of metal when the vessel is tilted. However, in a bottom-blown converter vessel having tuyeres located in its bottom, gas flow must be maintained at all times to prevent hot metal from flowing into the tuyeres and into the gas feed system. The constant flow of gas has a tendency to force out even greater quantities of atmosphere polluting gases from the bottom-blown vessel when it is tilted. Increasing the capacity of the exhaust system to cope with this condition is not only uneconomical but it is impractical because such exhaust systems usually handle a constant volume which means that their ability to withdraw gases and smoke is diminished to the extent that the exhaust system must handle air which enters the enclosure.

SUMMARY OF THE INVENTION

A general object of this invention is to provide improved pollution control apparatus for steel conversion and other metallurgical vessels.

Another object of this invention is to provide apparatus for inhibiting the discharge of pollutants from metallurgical vessels when the latter are disengaged from their smoke hoods and are in any of their alternate positions.

A further object of the invention is to provide apparatus for preventing the discharge of pollutants from a steel conversion vessel to the atmosphere when the vessel is being charged, teemed, deslagged or its contents are being sampled, as examples.

Yet another object of the invention is to substantially obviate using doors and other closure means to prevent atmospheric air from entering the vessel enclosure or the region around it.

These and other objects and advantages of the invention will become more apparent from a detailed description of a preferred embodiment of the invention which will be set forth hereinafter in reference to the accompanying drawings.

In general terms, the invention is exemplified by a converter vessel having an open upper end, an enclosure substantially surrounding it. The enclosure has at least one access opening to permit hot metal or scrap to be charged into the vessel and is associated with a system for exhausting the space within the enclosure around the vessel. Atmospheric air is prevented from entering the enclosure and from displacing smoke and gases to the atmosphere by devices which produce air curtains in the vicinity of certain necessary enclosure openings.

DESCRIPTION OF A PREFERRED EMBODIMENT

Figure 1:
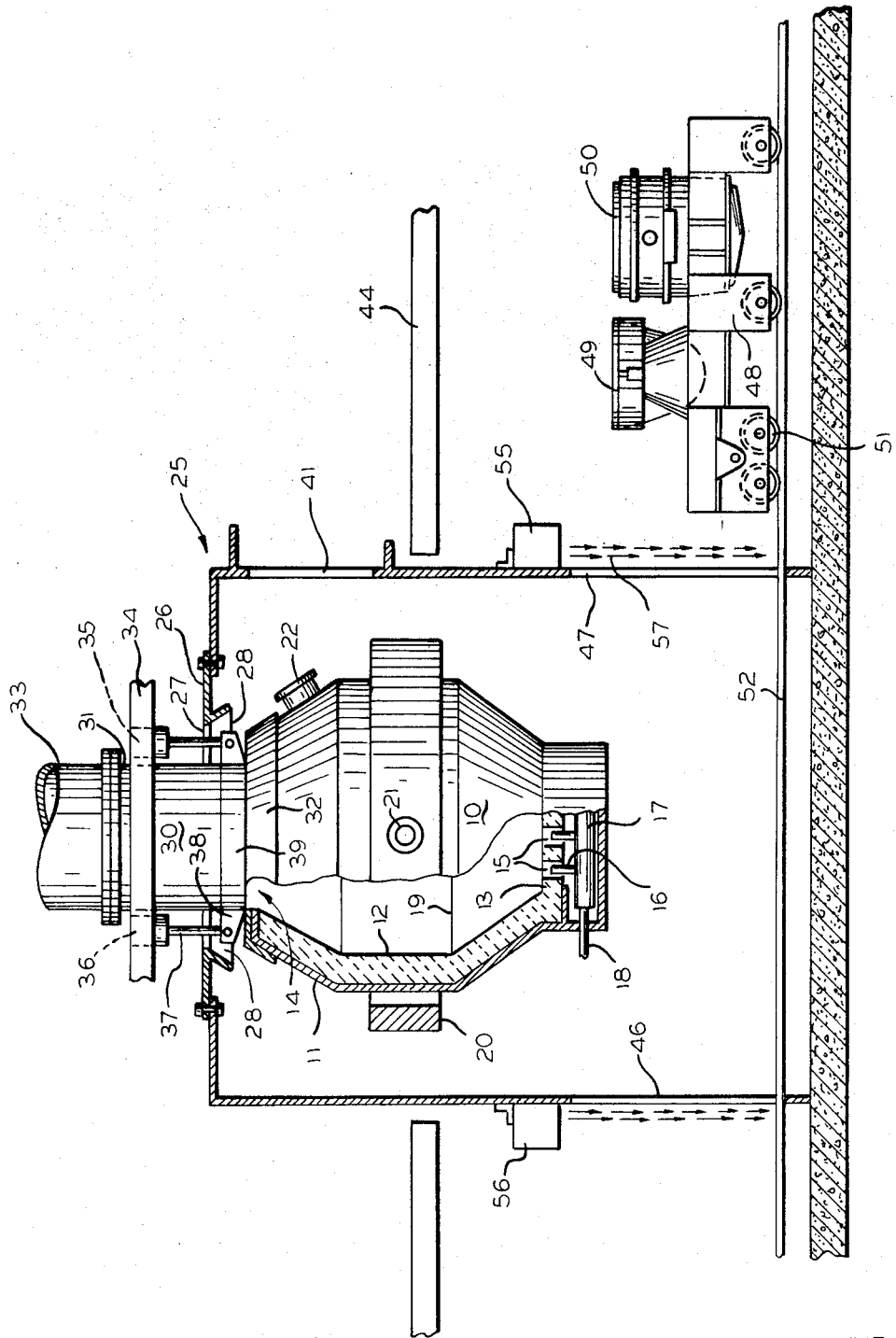
FIG. 1 is a front elevation view, partly schematic and partly in section, of a converter vessel associated with a pollution control system in accordance with the invention.
Figure 2:
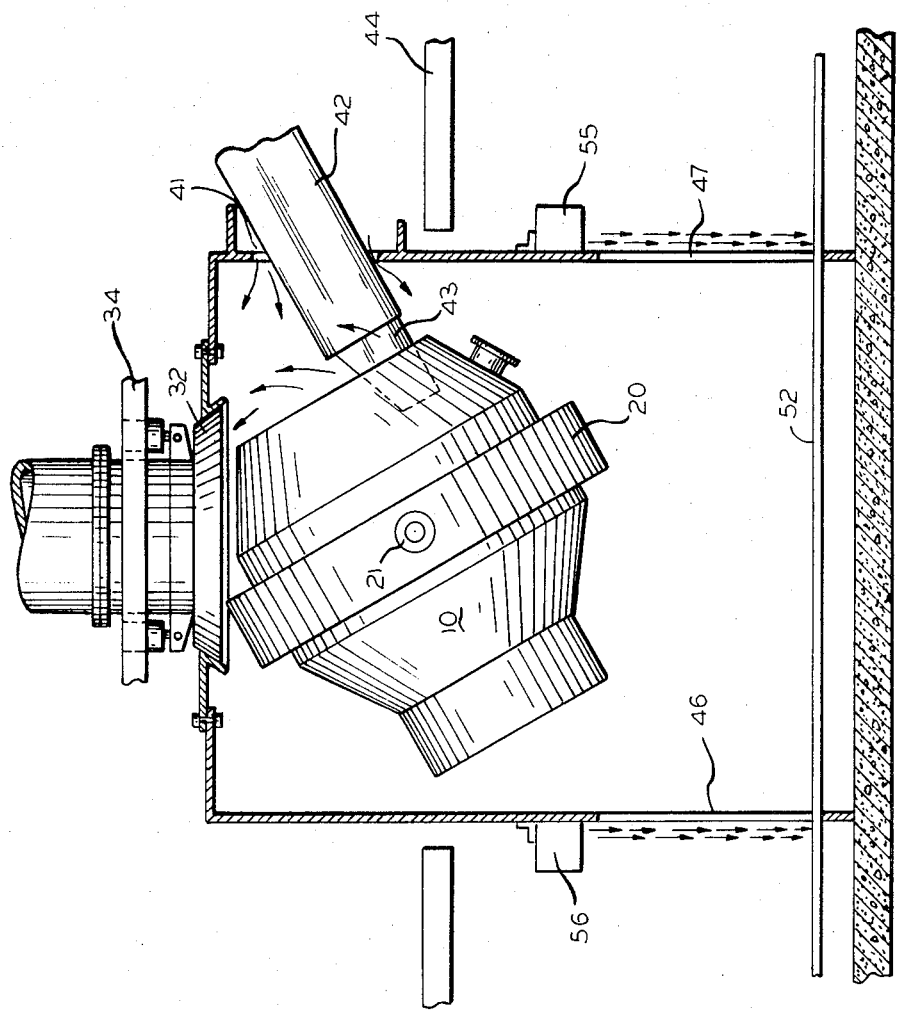
FIG. 2 is similar to FIG. 1 except that it illustrates tilting the converter vessel to permit charging it with scrap.

A typical application of the invention is illustrated in FIGS. 1 and 2 in connection with a bottom-blown steel converter vessel which is generally designated by the reference numeral 10. Those skilled in the art will appreciate that the invention is applicable to many other types of metallurgical vessels including top-blown basic oxygen and argon-oxygen systems.

Vessel 10 comprises a metal shell 11 which is lined with refractory about its sides 12 and its bottom 13. The top of the vessel has an open mouth 14 as can be seen in the part of the vessel 10 which is broken away. The refractory bottom 13 of vessel 10 has several tuyeres 15 which receive nozzles such as 16 that extend from a chamber 17. Chamber 17 has a supply pipe 18 for selectively conveying various gases and powdered materials to the chamber and the vessel. These gases and powdered materials are forced from the tuyeres through the molten metal within the vessel, the top surface of the metal being indicated by a dashed line marked with the numeral 19. The construction at the bottom of the vessel 10 is only schematized but it will be understood that there may be one set of centrally located tuyeres 15 for blowing gases, primarily oxygen, and powdered materials through the melt and there may be another set of tuyeres around the periphery through which propane or other hydrocarbon gas is injected along the interior refractory wall surfaces to prevent their deterioration.

Vessel 10 is supported within a trunnion 20 which has diametrically oppositely extending trunnion shafts such as 21. The supports in which the trunnion shafts are journaled are omitted as is the drive mechanism for tilting the vessel to each of a plurality of positions since the support and tilting mechanism are conventional. It is sufficient for present purposes to recognize that vessel 10 may be completely inverted so as to place its mouth 14 at the bottom or it may be partially tilted to permit charging through mouth 14 with hot metal or scrap or both and it may be tilted to a substantially horizontal position to permit pouring of molten metal from a suitable spout 22 in the top side of the vessel. Trunnion shaft 21 is hollow and may be connected with pipe 18 for conducting gases and powdered materials such as fluxes and the like to distributor chamber 17. There is usually a swivel joint, not shown, between hollow trunnion shaft 21 for facilitating connecting a supply pipe, not shown, for gases and powdered materials to rotatable trunnion shaft 21.

Vessel 10 is within an enclosure which is generally designated by the numeral 25. The enclosure 25 confines gases evolved from the vessel to its vicinity and acts as a shield for preventing dissemination of slag and molten metal that sometimes sputters from vessels of this type when they are open. The top of enclosure 25 is provided with a sealing annulus 26 in which there is an opening 27 surrounded by an angularly downwardly depending circular flange 28. Extending through opening 27 are some components of a water cooled smoke hood which is generally designated by the numeral 30. All of the structural details of smoke hood 30 are not shown because hoods of this general type are known in the art. Smoke hood 30 includes a cylindrical water cooled jacket 31 which connects at its lower end to an annular shroud 32 the latter of which has a central opening that is substantially coaxial with the mouth opening 14 of vessel 10. Cylindrical jacket 31 is coupled at its upper end to an exhaust pipe 33 which may connect to a stack or to gas cleaning apparatus, neither the stack or the apparatus being shown. In either case, however, a suction fan or natural draft will normally induce negative or subatmospheric pressure in exhaust pipe 33 and thus effect withdrawal of gases and smoke from vessel 10 through the hood assembly 30.

Means for lifting hood 30 to disengage it from vessel 10 includes a stationary beam or structure 34 on which there are two or more pneumatic cylinders such as 35 and 36. Connecting rods such as 37 are attached at 38 to a ring member 39. When a lifting force is exerted on member 39 by cylinders 35 and 36, smoke hood 30 is elevated clear of vessel 10 in which case tapered shroud 32 seats in the annulus defined by flange 28 as can be seen particularly well in FIG. 2. The seating of shroud 32 in annulus 28 creates a seal which prohibits noxious gases from leaking out of enclosure 25 and atmospheric gases from leaking into it when the hood is uncoupled or the vessel is tilted.

Enclosure 25 may be provided with one or more openings such as access opening 41 for the purpose of introducing various materials such as scrap through the mouth 14 of vessel 10 when it is tilted as appears in FIG. 2. An illustrative case is shown in FIG. 2 where scrap metal is being dumped into the vessel from a scrap cart 42 from which a spout 43 extends into the mouth of vessel 10. Only a fragment of scrap car 42 is shown but those skilled in the art will understand that the cart may run on tracks supported on charging floor 44 and may be adapted for angulation as shown in FIG. 2 so that its contents may be dumped. The scrap handling device may actually be a bin or ladle which is handled by an overhead crane instead of being a scrap car as shown. Other devices such as additive ladles may also be placed in proximity with access opening 41 for introducing their contents to vessel 10 when the latter is in tilted position.

Enclosure 25 may have other openings too. For instance, there may be openings such as 46 and 47 to allow positioning a cart 48 in alignment with vessel 10. Cart 48 may carry, for instance, a slag pot 49 and a teeming ladle 50. The cart has wheels 51 which run on a track 52 that extends across the space between openings 46 and 47 within the enclosure.

It is known to those versed in the art that when vessel 10 is tilted for the introduction of scrap as depicted in FIG. 2, the small negative pressure in exhaust pipe 33 causes an in-rush of air through openings such as 46 and 47 in which case the negative pressure within exhaust pipe 33 is usually insufficient to handle both the in-rushing air and the gases and smoke which evolve from vessel 10 when it is uncoupled from hood 30. Since the exhaust system usually handles a constant volume, some of the smoke gets into enclosure 25 and escapes to the atmosphere through openings such as 41 and around the scrap cart 42 or around any other device that may be situated in the opening. Some smoke may even exit through lower openings 46 and 47 which account for the fact that prior practice has been to have hinged or sliding doors cooperating with openings such as 46 and 47. Doors, of course, must be opened either manually or mechanically at appropriate times and thereby require the attention of an operator.

Figure 3:
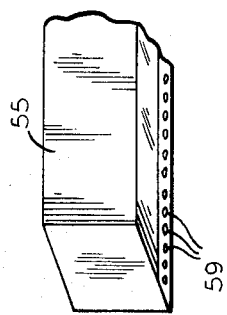
FIG. 3 is a fragmentary perspective view of a device for creating an air curtain for the purposes of the invention.

In accordance with the invention, atmospheric air is precluded from entering enclosure 25 by use of air curtain producing devices such as devices 55 and 56 which are installed immediately over openings 46 and 47 to typify their use. The air curtain device 55, for example, may be about as long as opening 47. The device is adapted to project a high velocity sheath or thin stream of air downwardly from it toward the floor in the direction indicated by the arrows marked 57. As shown in FIG. 3, the typical air curtain device 55 comprises a box in which there is suitable flow control mechanism, not shown. In the bottom of the box is a row of holes which are marked 59 and extend longitudinally of the box. The holes 59 are, of course, on the bottom of box 55 with respect to its orientation in FIG. 1. The sheath of air or air curtain from devices 55 and 56 flows at very high velocity transverse to the direction in which atmospheric air tends to flow through openings 46 and 47. The air curtain, however, prevents the atmospheric air from penetrating the path of the high velocity air so that atmospheric air does not enter enclosure 25 in significant quantities when vessel 10 is untilted, nor when it is tilted and uncoupled from its exhaust system. Reduction of the negative pressure within enclosure 25 is thereby inhibited by the air curtains.

Since the air curtains prevent influx of large quantities of atmospheric air through major openings such as 46 and 47, the negative pressure produced within enclosure 25 when vessel 10 is uncoupled from its exhaust system tends to be maintained. This negative or subatmospheric pressure causes relatively minor quantities of atmospheric air to flow into enclosure 25 around the small free spaces which must necessarily be maintained when a scrap cart 42 or other such device is situated in access opening 41. This minor flow of air does not materially affect the effectiveness of the constant volume exhaust system in which case the atmospheric air and substantially all of the smoke and noxious gases from the vessel are captured by the exhaust system. Moreover, the in-draft through opening 41 causes smoke and gas from the vessel to be entrained and swept into the exhaust system.

Suitable air curtain producing devices are available from various manufacturers including, for example, Dynaforce Corporation, Plainview, New York. Generally an air curtain device long enough to span the entire width of an enclosure opening will be selected. Wind or atmospheric air flowing at high velocity can be interrupted with the air curtain. Air velocities on the order of 20 to 35 miles per hour or about 30 feet per second up to as high as 55 feet per second and even higher can be stopped effectively provided the discharge height of the air curtain is properly related to the velocity of the air curtain. By way of example, an air curtain velocity of 2,700 feet per minute will effectively stop a 20 mile per hour or 30 feet per second wind over a discharge height of 20 feet. The same system which has an initial air curtain velocity of 6,000 feet per minute will stop a 35 mile per hour wind with a 3,750 feet per minute air curtain velocity over a discharge distance of 10 feet.

In summary, the foregoing description illustrates how enclosed metallurgical and other types of vessels which emit smoke, fumes and noxious gases can be prevented from contaminating the atmosphere with air curtains that assist in maintaining subatmospheric pressure in the vessel enclosure and preclude in-rush of atmospheric air that would overload the exhaust system. Substantially all of the noxious gases and smoke can now be drawn into the exhaust system and disposed of in a safe and clean manner. The need for providing cumbersome doors and other sealing devices for preventing inflow of air into an enclosure around a vessel is obviated and use of auxiliary exhaust systems for augmenting the main system can also be avoided. Thus, capital investment in equipment is reduced coextensively with reduction of atmospheric pollutants.

Although the invention has been illustrated and described in respect to one type of converter vessel and associated enclosure, those versed in the art will appreciate that the new air curtain pollution preventing means may be variously used in connection with other metallurgical vessels. Accordingly, the scope of the invention is to be determined only by interpretation of the claims which follow.

I claim:

1. A system for mitigating atmospheric pollution by a metallurgical vessel, comprising:
    a. enclosure means for a vessel that is adapted for being moved to various positions therein, said enclosure means having an access opening and at least another opening,
    b. exhaust means adapted to develop subatmospheric pressure for withdrawing gases and smoke from the vessel when the same is coupled with said exhaust means and for withdrawing the same from the vessel and said enclosure means when said vessel is uncoupled,
    c. air curtain producing means at at least said other opening projecting a high velocity air stream across the opening to limit flow of atmospheric air into said enclosure through the opening, thereby maintaining subatmospheric pressure in the enclosure so that when said vessel is uncoupled gases and smoke are inhibited from exiting through the access opening.

2. The invention set forth in claim 1 including:
    a. means adapted to retract at least a part of said exhaust means and thereby uncouple the same from said vessel, whereby to provide clearance for tilting the vessel and presenting an opening thereof in proximity with said access opening.

3. The invention set forth in claim 1 wherein:
    a. said enclosure means has a plurality of said other openings of substantial size and there is an air curtain producing means at each such opening.

4. The invention set forth in claim 2 wherein:
    a. said enclosure means has opening through which said exhaust means extends, and
    b. said exhaust means has means cooperating with said last-named opening to effect a seal when said exhaust means is retracted.

5. A system for mitigating atmospheric pollution from a bottom-blown converter vessel, comprising:
    a. enclosure means for a converter vessel that is substantially vertically oriented when operating normally and that has a mouth and is mounted for angulating on a horizontal axis for presenting the mouth at various positions within the enclosure means, said enclosure means having at least one access opening for introducing materials to the vessel mouth,
    b. a smoke hood means and an exhaust pipe means connected thereto, said smoke hood means being adapted for coupling and uncoupling with respect to said vessel mouth and said exhaust pipe means having subatmospheric pressure developed therein whereby to withdraw gas and smoke pollutants from the vessel and from the enclosure means, and
    c. air curtain producing means located in proximity with another opening in said enclosure and adapted to project a high velocity air current across the opening to exclude atmospheric air from said enclosure so that the exhaust means is effective to withdraw air through said access opening and thereby prevent outflow of pollutants therefrom.

6. Means for preventing air pollution by a metallurgical vessel that produces gas and smoke pollutants, comprising:
    a. enclosure means substantially enclosing a space occupied by a vessel, said enclosure means having openings,
    b. air curtain producing means situated at at least one of said openings and adapted to project a high velocity air stream substantially transversely to the path in which atmospheric air tends to flow into said opening.

7. The invention set forth in claim 6 wherein:
a. said air curtain producing means is substantially coextensive in length with its associated opening.

8. The invention set forth in claim 6 wherein:
a. said enclosure means has an access opening for charging the vessel, said access opening being sized to accommodate a vessel charging means,
b. exhaust means extending into said enclosure and having an inlet adapted to be coupled with a vessel and to be uncoupled therefrom so as to draw atmospheric air through that part of the access opening which is not occupied by the charging means.

9. A method for inhibiting flow of pollutants from a metallurgical vessel to the atmosphere, comprising:
a. substantially enclosing the vessel in an enclosure,
b. extending a subatmospheric pressure producing device to the enclosure for alternately placing the vessel interior and enclosure interior in communication with the device, thereby exhausting pollutants, and
c. concurrently projecting a high velocity curtain of air over a substantial opening in the enclosure to prevent air at atmospheric pressure from entering the same and from diminishing the subatmospheric pressure produced by the device.

* * * * *